March 14, 1939. R. CROWLEY 2,150,580
GOLF TEACHING AND PRACTICING DEVICE
Filed March 12, 1938
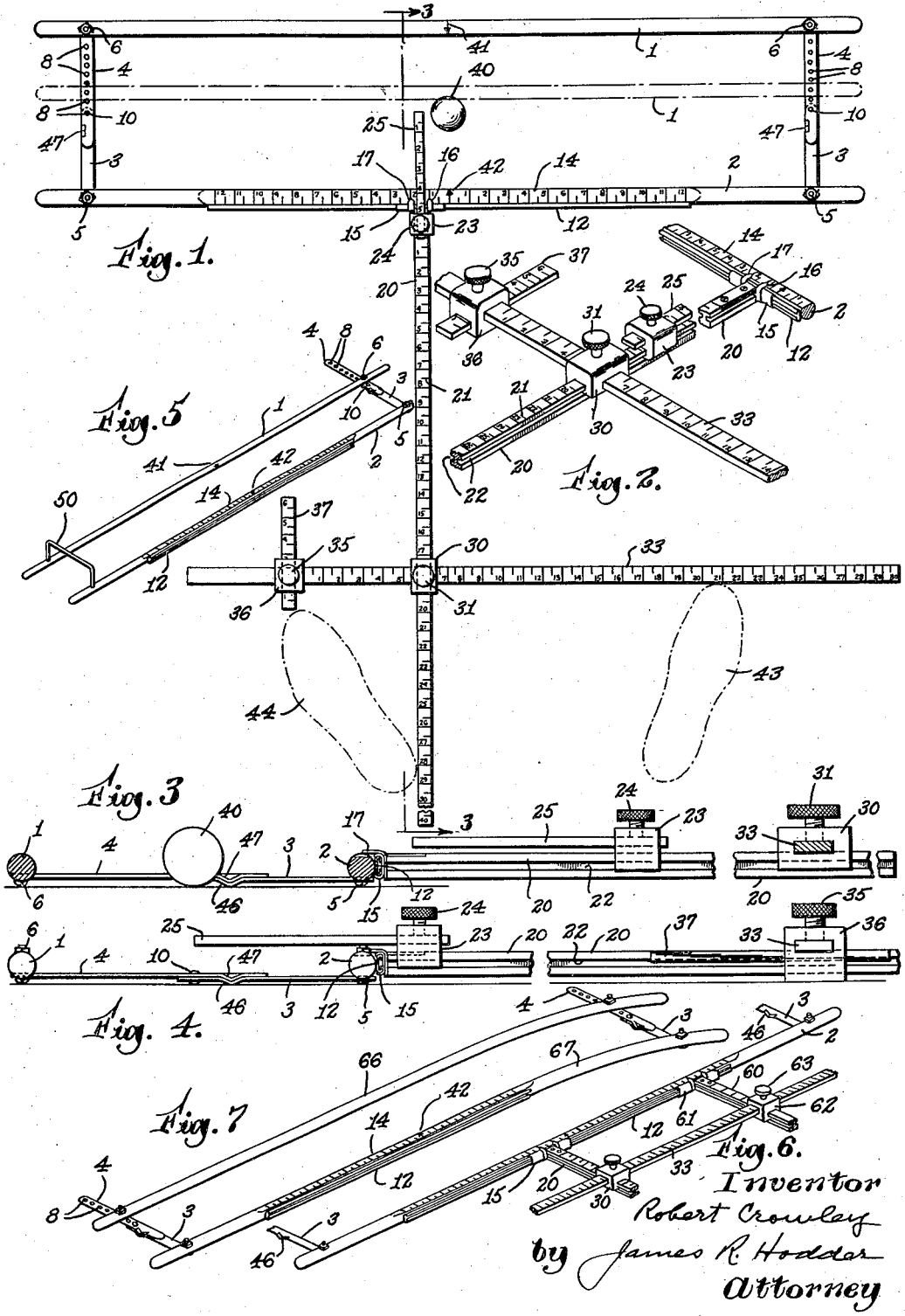
Inventor
Robert Crowley
by James R. Hodder
Attorney Patented Mar. 14, 1939

2,150,580

UNITED STATES PATENT OFFICE 2,150,580

GOLF TEACHING AND PRACTICING DEVICE

Robert Crowley, North Quincy, Mass.

Application March 12, 1938, Serial No. 195,499

3 Claims. (Cl. 273—35)

My present invention is a novel and improved device or apparatus for use in teaching accuracy and precision in golf strokes, including putting, either with the aid of an instructor or for self-improvement in developing one's golf game.

Heretofore, various devices have been made to aid in learning the game of golf, which comprised various types of measuring devices, mainly to indicate the stance of the player; but such prior devices have been incomplete or cumbersome, or otherwise objectionable, so that they have failed to be of general use or substantial advantage in teaching and practicing golf strokes.

An object of my invention consists in the combination of a stance guide and swing guide, and of course the combination of the two is of more substantial use in teaching or practicing golf strokes.

Furthermore, my invention provides a simple, efficient device which will afford a complete training and practicing guide for teaching, improving, and developing golf strokes, with particular facility to measure and adjust the stance of the player, and which also may be adjusted to varying accuracies of the swing of the club-head dependent upon the skill of the player, and also to aid in driving the ball in a straight path from a position between parallel spaced guides, and with due regard to the start of the "back swing" and the path of the club in the hitting area.

It is, therefore, an important object of my invention to provide a device which will train a golfer, whether in a golf school or in individual practice, to insure correct standing for the stroke or strokes being practiced.

Thus the apparatus is adjustable for determining the proper stance in driving or making approach shots, and also is equally adjustable for the distinctive different type of stance in putting, "chip shots", or the like. Thus, it is an important advantage to provide a device which may be quickly and readily adjusted to improve the play and practice of the golfer with every club from putter to driver.

Furthermore, an important object is to provide a golf-training, teaching, and practicing device adjustable for the varying degrees of skill of different players, and different degrees of skill for the same player, so that the device may be utilized to improve the play of the user whether he is a beginner or an expert, and at various times in between, as well as whether he is driving or putting.

A still further object of the invention is to provide a teaching, training, and practicing device of such easy and ready adjustability and capacity so that it may be utilized to follow out accurately written instructions as to the correct stance, play, and swing with each particular club.

An important feature is the provision of means in my present improved apparatus to aid in the start, direction, and control of the beginning of the "back swing" by the player, which is one of the most important and controlling factors in the player's game. This factor of the "back swing" has been largely neglected heretofore and, I believe, it is a distinct novelty in this art to provide apparatus to aid and improve the same.

A further important object is to provide in a single apparatus means and mechanism readily adjustable to permit variation in the stance of the player and to measure the same with accuracy and instantly relatively to the position of the ball, and also to provide parallel guides for the path of the club head, which still further enables the player to concentrate on his line of swing and to enable the player to eliminate tendencies to "slice" or "hook" from the straight path. The provision of such parallel guides for the path of the club head, which guides may furthermore be adjusted toward or from each other to meet individual requirements, in combination with the stance-adjusting and regulating means relative therewith, is also, I believe, a distinct novelty in this art and I wish to claim this combination herein broadly.

A still further important feature consists in the speed and economy with which the entire apparatus may be adjusted and the compactness with which it may be packed for carrying from one place to another, from a residence or clubhouse to a practice field, or, in fact, for either indoor or outdoor use.

Furthermore, the apparatus may be specially adjusted for driving or putting with ease and speed, as well as for varying the stance desired during use of the same.

In carrying out my invention I provide pairs or sets of interlocking, sliding, and adjustable guides or rods, preferably with measurements indicated thereon to facilitate adjustment, and with means, such as set screws or the like, to hold the interlocking guides in the position to which they have been adjusted. These guides thus become gauges adjustably fitted to any individual player's requirements, as well as for the varying and differing positions of stance and ball, as well as aiding the "back swing" and keeping the club-head traveling in the proper path while hitting the ball.

Furthermore, quick detachment and readjustment is permitted and the parallel swing guides may be adjusted to varying widths, dependent upon the skill and accuracy of the player.

Further features, improvements, and novel combinations will be more fully pointed out, described, and claimed.

Referring to the drawing illustrating preferred embodiments,

Fig. 1 is a plan view of my improved apparatus shown in one adjusted position;

Fig. 2 is a view in perspective on a slightly enlarged scale, with portions broken away, showing further adjustable features;

Fig. 3 is a cross-sectional view on the line 3—3 of Fig. 1 showing the adjusting gauge for the golf ball in retracted position;

Fig. 4 is a cross-sectional view corresponding to Fig. 3 showing the golf ball adjusting gauge in extended position;

Fig. 5 is a perspective view illustrating the set of parallel gauges adjusted for putting;

Fig. 6 is a partial view in perspective of a modified form, and

Fig. 7 is a view in perspective of a modified form of the parallel guides for aiding in driving the ball in a straight path.

Referring to the drawing, I provide a pair of parallel guide-way rods 1 and 2 and unite them by a pair of foldable link members 3—3 and 4—4, the members 3—3 being pivoted adjacent the opposite ends of the guide member 2, as shown by bolts 5—5, Fig. 1, and the links 4—4 being correspondingly pivotally secured to the adjacent ends of the rods 1 by bolts 6—6. The links 4—4 are provided with a plurality of openings 8—8 therethru to permit varying or widening of the spacing of the rods 1 and 2 by shifting the attaching bolts 6—6 and rod 1, as will be readily understood.

Secured to the guide 2 on its vertical face is a track 12, and on the uppermost face of the rod 2 is attached or formed a rule or measure 14. Adapted to fit upon the track 12 is a slide 15, secured to the end of a perpendicular gauge 20, also having a rule or measurement, as indicated on the top at 21. The gauge 20 is formed with side grooves 22 in which a sliding block 23 will fit and slide, said block being arranged with a slot thru which a short bolt-engaging rule 25 may slide and be held in adjusted position by a set screw 24 threading into the block 23 and impinging on the slide rule 25. Attached to the slide 15 are a pair of pointers 16 and 17 spaced at each side to permit the slide rule 25 to be adjusted between the same and permit visibility of these pointers to register with the numbers on the rule 14, as the entire gauge 20 may be slid lengthwise of the track 12 for adjustment relatively with the guide-way rods 1 and 2.

Fitted also on the gauge 20 and adapted to slide within the grooves 22 is a block 30, having a cross-slot at right angles to the gauge 20 thru which a cross-member 33 may slide, the same being held in locked position when desired by a thumb nut 31 threaded thru the block 30 and adapted to impinge upon the face of the cross-member 33. This cross-member 33 also is provided with numbered indications in or on the top face, as shown in Fig. 1. Fitted to slide upon the cross-member 33 is also a sliding block 36 thru which a slot is formed perpendicular to the member 33 and parallel with the gauge 20, which receives a short sliding rule 37.

A set screw 35 threaded thru the top of the block 36 and impinging against the rule 37 will hold it in position wherever adjusted, and the sliding block 36 may be similarly moved lengthwise of the member 33.

With the apparatus as thus described the ball 40 is teed or placed between the parallel guideways 1 and 2 and, in alignment with the centering arrows 41 on the rod 1 and 42 on the rod 2. Thereupon the gauge 20 and short rule 25 are adjusted to be adjacent the ball 40, and the cross-member 33 is similarly adjusted lengthwise of the gauge 20 for the stance of the player. Dotted line indications of the player's feet 43 and 44 are shown in Fig. 1, as an example, with the toe of the right foot as indicated at 43 in contact with the cross-member 33 and with the left foot as indicated at 44 having its heel in contact with the edge of the gauge 20 and the toe, if not in alignment with the cross-member 33, then spaced therefrom slightly and an adjustment of the slide 37 showing the correct position for the toe, as indicated in Fig. 1.

The slide 25 may then be retracted, as indicated in Fig. 3, and the player will practice his swing. The adjustments are readily made and changed by a mere tightening and loosening of the various thumb nuts 24, 31, and 35, and the friction of the slide 15 on the track 12 is sufficient to hold the gauge 20 in position where adjusted.

In utilizing the apparatus as thus adjusted and described, the player can accurately repeat the correct stance for every practice stroke. In "addressing" the golf ball 40, the player is aided in visualizing the straight and proper path of swing thru which the club head should be directed and, hence, the path of flight of the ball 40 by the parallel guide members 1 and 2.

In making the back stroke the player must be careful to swing his club head back from the ball without striking or grazing these parallel members 1 and 2, and similarly must complete and finish his swing, "following thru" after hitting the ball without permitting the club to strike or graze the guide members 1 and 2 in front of the ball position. Should his club strike the guide members 1 and 2, the player is of course immediately aware that the stroke is not properly directed or completed and the player may, in fact, repeatedly practice his swing between these guide members before setting up the ball 40. Also, the player may vary the width of the guide members 1 and 2 thru adjustment of the links connecting them, already described, and as his proficiency increases he may narrow the member 1 to a relatively short space, as indicated for the position 1 in dotted lines, thus still further increasing the accuracy of his stroke between these parallel guide members.

When it is desired to practice putting only, the slide 15 may be moved off the track 12 at either end and the gauge 20 and its attached cross-member 33 thus removed, leaving the parallel guide members connected only by the links 3 and 4. Furthermore, in putting it is desired to narrow the space between the rods 1 and 2, and for this purpose the left-hand links 3 and 4 may be quickly detached and a wire bracket 50 fitted in thru the recesses left by removing the bolts 5 and 6 when detaching the link members and correspondingly adjusting the width at the opposite links 3 and 4, as clearly shown in Fig. 5.

Thus the apparatus is quickly fitted for putting and the player may position the ball between the areas 41 and 42 and gauge and measure his "back swing" on the rule 14 as well as maintaining the spacing necessary for straight path of the ball thru the swinging of the club head between the parallel guide-ways 1 and 2.

In order to enable the guide rods 1 and 2 to be quickly folded for transportation without detaching the links and in order to hold the links 3 and 4 substantially rigid when in the extended position as shown in Fig. 1, I form cooperating recesses and projections 46 and 47 which, when snapped together, retain the links 3 and 4 in alignment but which may be easily sprung apart to permit each set of links 3 and 4 to be folded up upon their attaching pivots 10—10, as will be readily understood.

In Fig. 6 I have illustrated a slightly modified form wherein the guideway 2 has attached to it on the track 12 two gauges, viz. in addition to the gauge 20 a corresponding and parallel slide gauge 60. This additional gauge 60 is secured on the track 12 by a slide 61 identical with the slide 15 holding the gauge 20 to the track and extending perpendicular to the member 2 as a further guide for the right foot of the player, as indicated at 43, giving a similar heel contact and positioning location. The cross-member 33 may also be fitted thru a sliding block 62 similar to the sliding block 30 on the gauge 20 and with a tightening thumb screw 63 also fitted thereon to hold the cross-member 33 as it is slidingly adjusted thru the block 62. This gives added and more definite means of positioning the right foot with equal facility in adjustment to that for positioning the left foot, as outlined at 44.

In Fig. 7 I have shown a still further modification wherein the parallel guide members are curved slightly at the right to facilitate the swinging action of the club of the user. In this form, parallel members 66 and 67 are employed to which the links 3 and 4 are secured, but with the right ends of these parallel guide members curved substantially as shown and with a similar scale and track fitted thereon for sliding adjustment of the gauge 20, or 20 and 60, as above explained.

I claim:

1. A golf-training and practicing apparatus of the kind described, comprising parallel guide rods adapted to be flat on the ground and spaced to receive a golf ball therebetween and to direct the path of a freely swinging club head, above said rods in combination with a gauge positioned perpendicularly to said rods and having a slidable connection with one of said rods, a cross-member adjustable lengthwise of said gauge and cross-wise thereof to predetermine the stance of the player relatively with the parallel rods and the position of the ball to be struck.

2. A golf-training and practicing apparatus of the kind described, comprising parallel guide rods adjustably spaced apart to receive a golf ball therebetween and to direct the path of a freely swinging club head above said rods, numbering indications on one of said rods, a gauge positioned perpendicular to said numbered rod and simultaneously connected therewith, a cross-member adjustably secured to said gauge and movable longitudinally thereon and cross-wise thereof, and a movable ball-locating member adjustable lengthwise of the gauge and extending between said spaced parallel rods to locate, relatively, the ball and the entire apparatus, whereby the stance of the player can be accurately located and predetermined relatively with the ball to be struck.

3. Apparatus of the kind described comprising a pair of adjustable guide rods to be positioned lengthwise in the direction of the line of flight of a golf ball to be struck, a pair of links adjacent each end of said rods and adjustable connections between said rods and links permitting variation in spacing the rods and folding of the same together, means to position the stance of the player relatively with said ball, comprising a gauge perpendicular to said parallel rods and slidingly connected with one rod, a cross-bar adjustable lengthwise of said gauge and cross-wise therewith, and a further adjustable slide on said cross-bar.

ROBERT CROWLEY.